Figure 1:
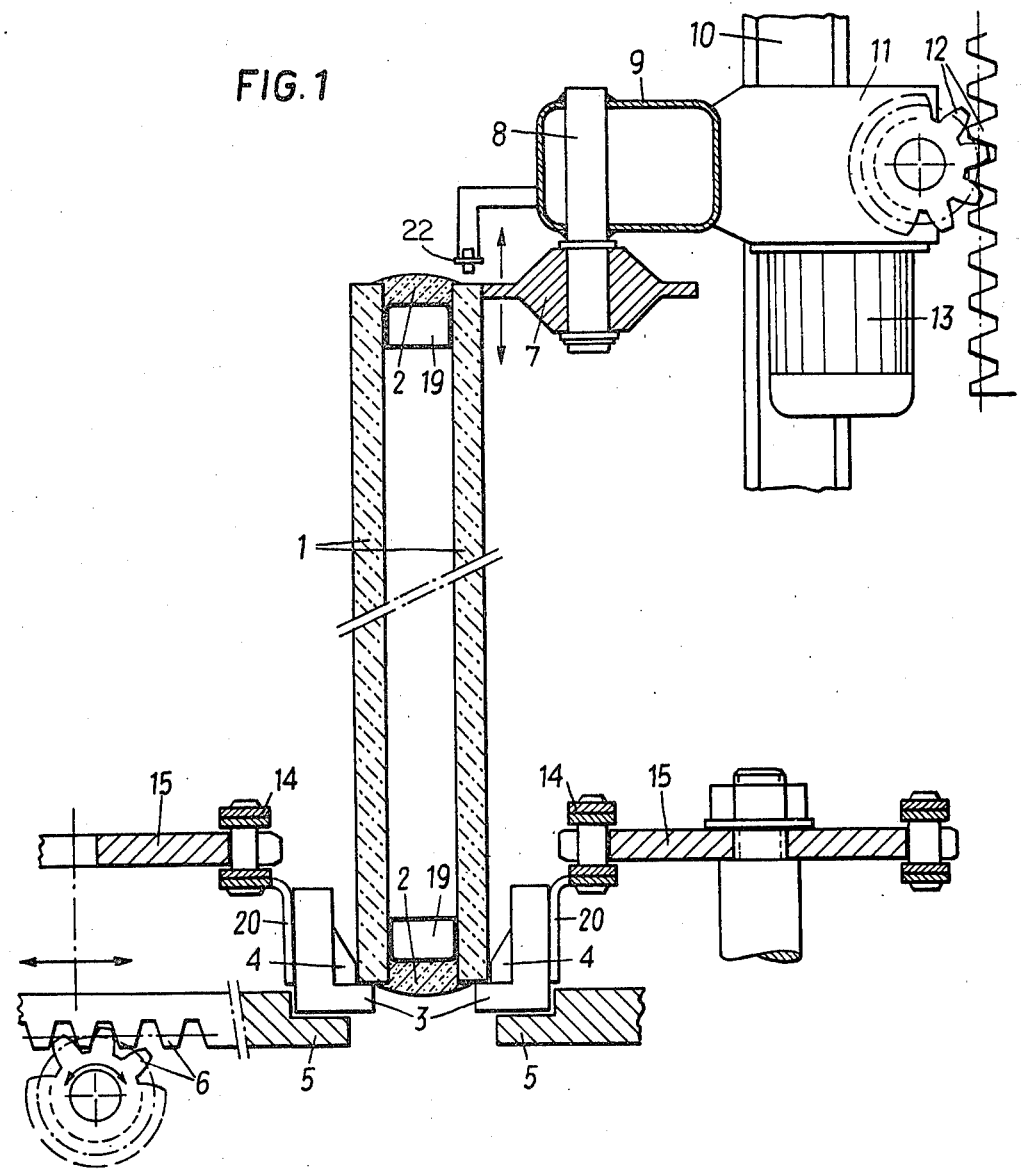

United States Patent [19]

Lisec

[11] 4,422,541
[45] Dec. 27, 1983

[54] APPARATUS FOR CONVEYING INSULATING GLASS PANES

[76] Inventor: Peter Lisec, Bahnhofstrasse 34, Amstetten-Hausmening, Austria

[21] Appl. No.: 281,706

[22] Filed: Jul. 9, 1981

[30] Foreign Application Priority Data

Sep. 22, 1980 [AT] Austria ................................ 4725/80

[51] Int. Cl.³ ............................................. B65G 15/14
[52] U.S. Cl. .................................. 198/627; 198/649; 198/817; 198/836
[58] Field of Search ............... 198/626, 627, 649, 650, 198/836, 817

[56] References Cited

U.S. PATENT DOCUMENTS

| | | | |
|---|---|---|---|
| 2,671,241 | 3/1954 | Starner ................................ | 198/650 |
| 2,777,562 | 1/1957 | McCahon et al. .................. | 198/627 |
| 3,108,682 | 10/1963 | Zipper ................................. | 198/626 |
| 3,857,475 | 12/1974 | Smith ................................. | 198/627 |

FOREIGN PATENT DOCUMENTS 2820630  1/1979  Fed. Rep. of Germany .

OTHER PUBLICATIONS

Byrd et al., "Transfer Mechanism for Processing Printed Wiring Boards," *Technical Digest*, No. 44, pp. 11-12, Oct. 1976, Western Electric Co., Inc.

*Primary Examiner*—Joseph E. Valenza
*Assistant Examiner*—Jonathan D. Holmes
*Attorney, Agent, or Firm*—Young & Thompson

[57] ABSTRACT

The invention relates to apparatus for conveying insulating glass panes which are slightly inclined from the vertical and have edge grooves filled with a sealing compound. Pairs of mutually opposite supports are provided, which are moved in the direction of conveyance and have substantially horizontal supporting surfaces and engage the lower edge face of each of the individual glass panes of each insulating glass pane only in an outer portion of the lower edge face. Backing rollers are provided, which are freely rotatably mounted on substantially vertical axes and adapted to engage the insulating glass pane only close to its upper edge.

9 Claims, 3 Drawing Figures

APPARATUS FOR CONVEYING INSULATING GLASS PANES

This invention relates to apparatus for conveying insulating glass panes which are slightly inclined from the vertical and have edge grooves filled with a sealing compound.

In the known apparatus for conveying substantially vertically disposed insulating glass panes, the latter stand on a roller conveyor or the like. This gives rise to problems because the edge groove seal of insulating glass panels must be so designed that the sealing compound surrounds the glass pane edge adjacent to the edge groove so that the sealing compound inevitably protrudes from the edges of the individual glass panes of the insulating glass pane and often covers also the edge faces of said individual glass panes. Attempts to provide insulating glass panes in which the edge grooves are not entirely filled with sealing compound have not produced satisfactory results because in that case there will be a higher water vapor diffusion rate at the edges of the glass panes and the seal so that an excessive amount of water vapor can enter the interior of the insulating glass pane within a relatively short time and may soon result in sweating.

If insulating glass panes having edge grooves filled with a sticky sealing compound are conveyed in an upright orientation an conveyor rollers, sealing compound will stick to the conveyor rollers and will deform the surface of the sealing compound of subsequently conveyed insulating glass panes. Besides, sealing compound adhering to conveyor rollers may tear sealing compound from edge grooves. Attempts to wet the conveyor rollers with an antistick agent have not produced satisfactory results because the antistick agent becomes gradually mingled with the sealing compound contained in the edge grooves and as a result becomes less effective and adversely affects the properties of the sealing compound.

The disadvantages described hereinbefore in connection with conveyor rollers will be even more severely encountered where conveyor belts are used because in that case the undesired results occur throughout the length of the insulating glass pane.

The use of conveyor belts provided with bosses or ribs for preventing a contact of the conveyor belt with the insulating glass pane throughout the adjacent edge face thereof has not proved satisfactory because the same problems as with the conveyor rollers arise at the points of contact.

All systems described hereinbefore which have been used to convey insulating glass panes involve substantial expenses for cleaning the conveyor.

The known conveying apparatus for conveying insulating glass panes having an orientation of about 5 to 6 degrees from the vertical have another disadvantage residing in that the backing rollers are distributed throughout the surface of the insulating glass pane. As these rollers contact the entire surface of the insulating glass pane, adhesive patches sticking to the rollers may soil the insulating glass pane, which must then be cleaned manually with solvents.

Similar problems arise where backing belts having drive pulleys rotating on substantially vertical axes are used instead of the backing rollers.

It is also known to provide substantially vertical backing walls formed with bores through which air is discharged so that an air cushion is formed between the backing wall and an insulating glass pane. Where such backing walls are used, dust contained in the air cushion may deposit on the insulating glass panes and protruding sealing compound may contact the backing wall and may stick thereto so that the subsequent insulating glass panes will be soiled.

It is an object of the invention to provide an apparatus which is of the kind described first hereinbefore and is free from the disadvantages indicated hereinbefore.

This is accomplished according to the invention in that pairs of mutually opposite supports are provided, which are moved in the direction of conveyance and have substantially horizontal supporting surfaces and engage the lower edge face of each of the individual glass panes of each insulating glass pane only in an outer portion of said lower edge face and that backing means are provided, which are freely rotatably mounted on substantially vertical axes and adapted to engage the insulating glass pane only close to its upper edge.

In the apparatus according to the invention the use of the moving supports ensures that there will be a clearance between the supports, which engage the lower edge face of each individual glass pane of each insulating glass pane only in an outer portion of said lower edge face, up to one-half of the thickness of each individual glass pane, so that the supports will not contact the sealing compound which is contained in the edge groove between the individual glass panes and protrudes from the edges of the individual glass panels. As a result, the surface of the sealing compound contained in the edge groove of the insulating glass pane will be freely suspended as the pane is conveyed by the apparatus according to the invention and will not be contacted by any conveying means and the sealing compound will not be deformed as the insulating glass pane is conveyed and as it is taken from the conveyor.

Owing to the specific arrangement of the freely rotatable backing rollers, no part of the surface of the glass pane, throughout the height and length thereof, will be contacted by backing rollers or backing surfaces or conveyor belts. In the apparatus according to the invention, no sealing compound protruding from the edges of the glass panes can contact a support between the glass and the backing wall or backing rollers so that the previously cleaned glass surfaces will not be soiled.

To permit an adaptation of the apparatus according to the invention to insulating glass panes of different sizes, which are to be conveyed, the freely rotatable backing rollers may be secured to a common carrier, which is adapted to be adjusted upwardly and downwardly relative to the frame of the apparatus under the control of a detector, which detects the elevation of the upper edge of the insulating glass pane.

In a practical embodiment of the invention, the supports are secured to two mutually parallel, endless conveyor elements and rest on mutually parallel guide rails disposed under the supports.

To permit an adaptation of the apparatus to insulating glass panes of different thicknesses, which are to be conveyed, the spacing of the supports and that of the guide rails may be adjustable.

In one embodiment of the invention, the supports have pressure contact jaws formed with substantially vertical pressure contact surfaces, which are adapted to contact the outside surfaces of the individual glass panes of the insulating glass pane and, if desired, are adapted to apply pressure thereto.

That embodiment of the apparatus according to the invention will ensure a particularly reliable conveying of the insulating glass panes.

An absolutely synchronized revolution of the conveyor elements to which the supports are secured will be ensured if each of the conveyor elements is trained around two reversing members, which are rotatable on first axes spaced apart along said conveyor element, a first gear is non-rotatably connected to one of said reversing members associated with each of said conveyor elements, and two second gears are in mesh with each other and with respective ones of said first gears. Said second gears will be effectively mounted regardless of the spacing of the two conveyor elements if said second gears are rotatably mounted in a yoke on second axes and two links are provided, each of which is pivoted at one end on one of said first axes and at the other end on one of said second axes.

Within the scope of the invention it has proved satisfactory to provide a frame carrying at least one conveyor element and the guide rail associated with the supports that are secured to said conveyor element, which frame is displaceable, e.g., on rails, transversely to the direction of conveyance.

In a preferred embodiment of the invention, one of the conveyor elements and the guide rail associated with the supports secured to said conveyor element are fixedly secured to the frame of the apparatus and said frame carries also the carrier for the backing rollers.

Figure 2:
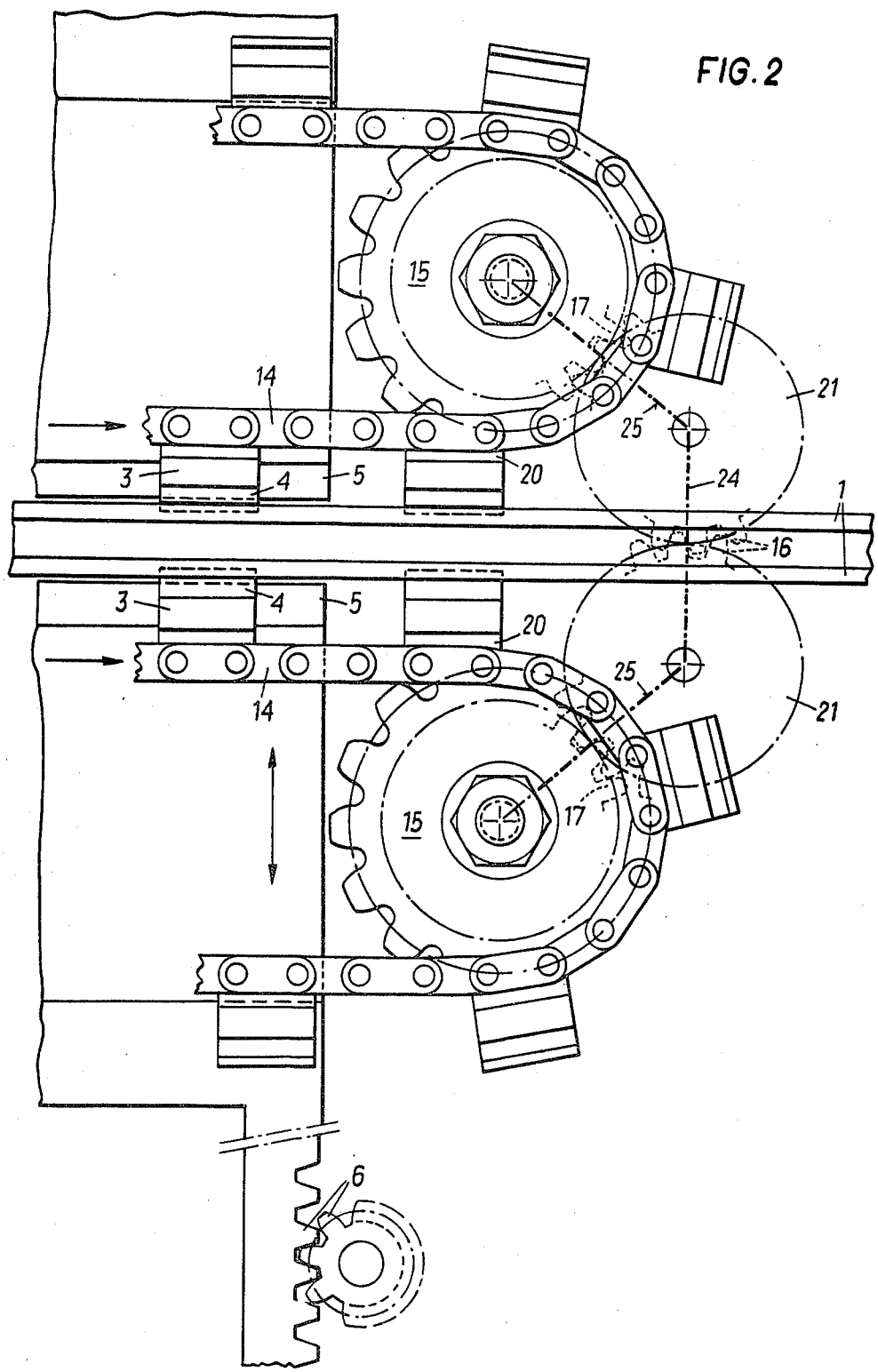
Figure 3:
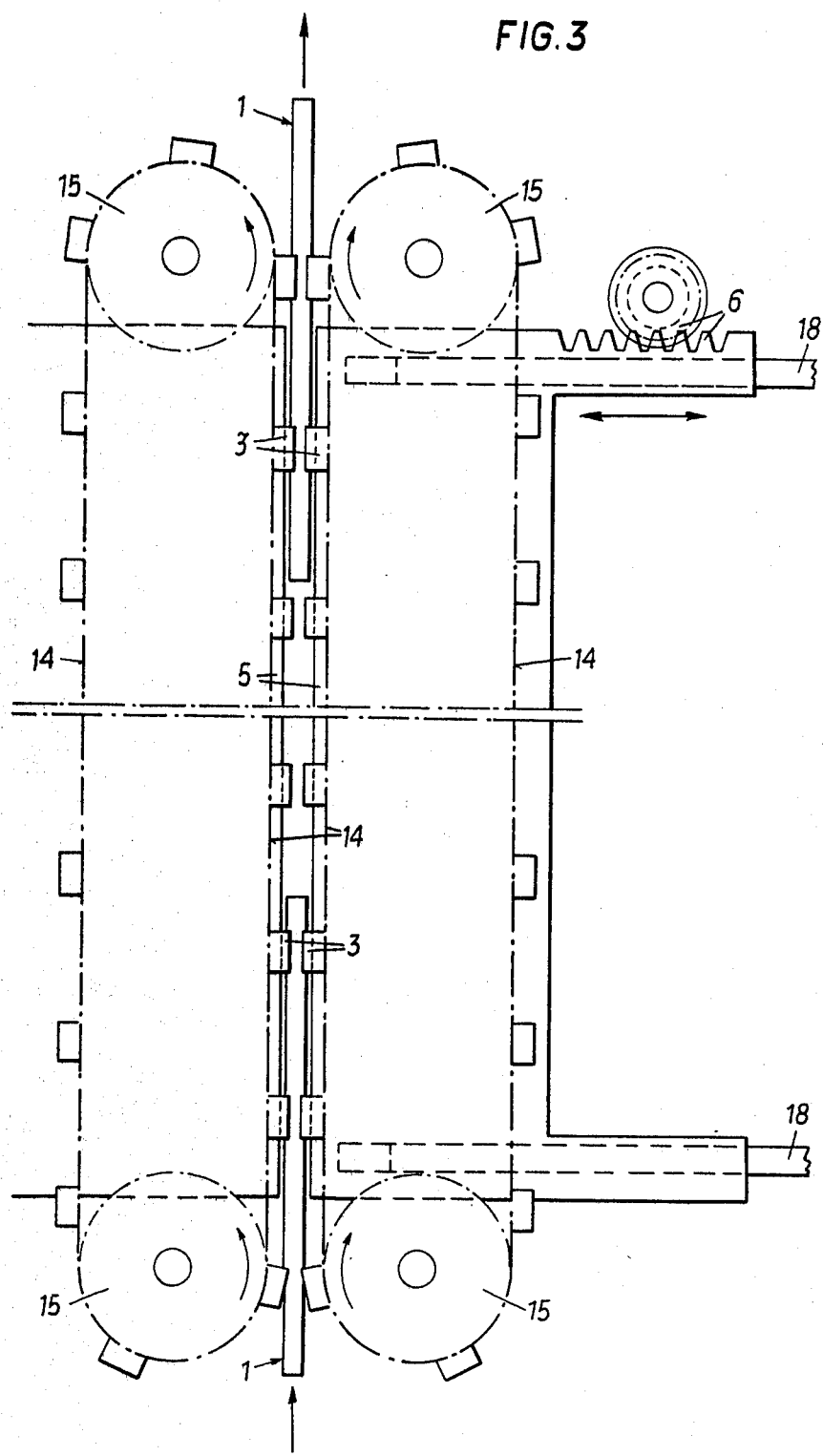

Further details and features of apparatus according to the invention will become apparent from the following description of an embodiment shown by way of example on the accompanying drawings, in which FIG. 1 is a vertical sectional view showing the essential parts of apparatus embodying the invention, FIG. 2 is a top plan view showing part of the apparatus embodying the invention and FIG. 3 is a diagrammatic top plan view showing the entire apparatus for conveying insulating glass panes.

The basic concept of the apparatus embodying the invention is best apparent from FIG. 1. FIG. 1 shows an insulating glass pane comprising two individual glass panes 1 and an interposed spacing frame 19. The edge grooves of the insulating glass pane are filled with a sealing compound 2, which protrudes from the edge faces of the individual glass panes 1 in order to ensure a sufficiently high resistance to gas diffusion. It is also apparent from FIG. 1 that the insulating glass pane is supported underneath only by supports 3, which are substantially L-shaped in cross-section and may be made, e.g., of plastic material and have horizontal arms, which extend inwardly under individual glass panes 1 and contact only the outer portion of the edge faces thereof. The horizontal arms of the supports 3 will usually extend inwardly not in excess of the center line of the edge faces of the respective individual glass panes 1. It is also apparent from FIG. 1 that there is a clearance between the supports 3 and the sealing compound 2 protruding from the edges of the individual glass panes 1 extends into said clearance.

The supports 3 are provided with pressure contact jaws 4, which have substantially vertical pressure contact surfaces, which are in contact with the outside surfaces of the individual glass panes 1 and are preferably urged against the latter so that a reliable conveyance of the insulating glass pane by the apparatus is ensured.

The supports 3 are arranged in pairs of mutually opposite supports and are moved in the direction of conveyance by revolving conveyor elements, which in the embodiment shown by way of example consist of conveyor chains 14. The supports 3 are connected to the conveyor chains 14 by straps 20. The underside of each support 3 is in sliding contact with a guide rail 5.

To permit the use of the apparatus embodying the invention for conveying insulating glass panes differing in thickness, the revolving conveyor chain 14 shown on the left in FIG. 1 is displaceable in the direction of the arrow shown on the drawing, transversely to the direction of conveyance. For that purpose said chain and the associated guide rail 5 are mounted in a frame, which is slidably mounted on rails 18 and driven by a rack-and-pinion drive 6.

The other conveying chain, shown on the right in FIG. 1, and the associated guide rail 5, are preferably immovably secured to the frame of the apparatus.

The apparatus also comprises backing rollers 7, which are freely rotatably mounted on substantially vertical axles 8, which are mounted in a common carrier 9. These backing rollers are engaged by the insulating glass panes, which are inclined 5 to 6 degrees from the vertical as they are conveyed by the apparatus.

As is apparent from FIG. 1, the backing roller 7 engages one of the individual glass panes of each insulating glass pane at the upper edge thereof.

It is apparent that in the apparatus the insulating glass pane is engaged only by the supports 3 and the backing rollers 7, which engage the insulating glass panes at their upper edges so that the entire surface of the glass, throughout its height and length, is free from contact, with backing rollers, backing surfaces or conveyor belts. As a result, a soiling of the previously cleaned glass surfaces is absolutely precluded in the apparatus according to the invention.

In practice the backing rollers will engage the glass panes in a marginal zone which is not larger in width than 2 mm. A soiling in such a narrow marginal zone close to the sealing groove is entirely insignificant because these marginal zones are covered by an edge-protecting tape or by a rebate in a window frame or sash frame and are not visible. For this reason a subsequent cleaning of the insulating glass panes in that outermost marginal zones is not necessary. Besides, the insulating glass panes which may be coated with adhesive adjacent to the edge grooves can be removed from the conveyor without difficulty because this is not obstructed by the backing rollers 7 and the carrier 9.

To ensure that the backing rollers 7 can engage the individual glass pane 1 at its upper edge regardless of the size of the insulating glass panes, the carrier 9 is slidably mounted on the frame 10 of the apparatus by means of a slide shoe 11, which is displaceable by means of a drive motor 13 and a rack-and-pinion drive 12. The detector 22 senses the elevation of the upper edge of the individual glass pane and controls the drive motor 13 so that the latter moves the backing rollers 7 to a position in which they engage the individual glass pane 1 only at its upper edge, as is indicated in FIG. 1.

The arrangement shown in FIG. 2 ensures that the conveyor chains 14 to which the plastic supports 3 are rigidly secured by the straps 20 will revolve in absolute synchronism. A pair of gears 21 are provided, which mesh with each other and each of which meshes with one of the gears 17, which are non-rotatably connected to sprockets 15 for driving respective conveyor chains. The gears 21 are mounted in a yoke 24, to which two links 25 are connected, which are pivoted on the axes of the gears 21. The free ends of the links 25 are pivoted on the axes of the respective gears 17. It is apparent that the two gears 21 will mesh with each other and with the respective gears 17 even when the spacing of the two conveyor chains 14 is changed.

What is claimed is:

1. In apparatus for conveying insulating glass panes comprising each two spaced apart individual glass panes, which define grooves at the edges of said insulating glass panes, which grooves are filled with a sticky sealing compound, said apparatus being operable to convey said insulating glass panes with an inclination from the vertical along a predetermined path so that each of said individual glass panes has a lower edge face, an upper edge face, an outside surface, and an outer upper edge between said upper edge face and said outside surface, the improvement residing in that a plurality of pairs of mutually opposite rigid supports disposed on opposite sides of said path are provided and are spaced apart along said path and movable along the same, drive means for moving said pairs of supports in unison along said path are provided, the supports of each of said pairs are adapted to engage the lower edge faces of respective individual glass panes of each of said insulating glass panes only in an outer portion of said lower edge faces, backing means disposed on one side of said path and spaced above said supports and adapted to engage one of said individual glass panes of each of said insulating glass panes on its outside surface, two parallel guide rails which are spaced below said rigid supports and engage the latter from below, said drive means comprising two parallel endless conveyor elements disposed on opposite sides of said path, the supports disposed on each side of said path being secured to the adjacent said conveyor element, the supports of each of said pairs carrying respective pressure contact jaws having substantially vertical pressure contact surfaces facing each other and adapted to resiliently engage respective individual glass panes of each of said insulating glass panes on said outside surfaces close to said lower edge face, and means to cause said pressure contact jaws to apply pressure resiliently to said outside surfaces, said pressure contact jaws cooperating resiliently with said rigid supports to maintain said lower edge faces of said panes on said rigid supports with said rigid supports out of contact with said sticky sealing compound.

2. The improvement set forth in claim 1, wherein
two parallel guide rails are provided, which are spaced below said supports and engage the latter from below, said drive means comprise two parallel endless conveyor elements disposed on opposite sides of said path, and the supports disposed on each side of said path are secured to the adjacent one of said conveyor element.

3. The improvement set forth in claim 1, wherein
the two supports of each of said pairs are adjustable relative to each other transversely to said path and
the two guide rails are adjustable relative to each other transversely to said path.

4. Apparatus as set forth in claim 1, wherein
each of said conveyor elements is trained around two reversing members, which are rotatably mounted on respective first axes spaced apart along said path, a first gear is non-rotatably coupled to one of said reversing members associated with each of said conveyor elements, a second gear is in mesh with each of said first gears and said second gears mesh with each other.

5. Apparatus as set forth in claim 4, wherein
said second gears are rotatably mounted on spaced apart second axes in a yoke and
two links are provided, which are disposed on opposite sides of said path and pivoted at one end on one of said first axes and at the other end on one of said second axes.

6. The improvement set forth in claim 1, wherein
a slide frame is provided, which is adjustable relative to said path transversely thereto and
one of said conveyor elements and one of said guide rails disposed on the same side of said path as said one conveyor element are carried by said slide frame.

7. The improvement set forth in claim 6, wherein
transverse guide rails are provided, which extend transversely to said path, and
said slide frame is slidably mounted on said transverse guide rails.

8. The improvement set forth in claim 1, wherein said supports are L-shaped and engage both the outer portion of said lower edge faces of the glass panes and also the adjacent vertical side edges of the glass panes, said guide rails having L-shaped recesses therein that engage the undersides of said L-shaped supports and the adjacent upright outer sides of said supports.

9. The improvement set forth in claim 8, and means selectively to change the spacing of said guide rails thereby to exert pressure on said panes of glass through said supports.

* * * * *